United States Patent
Xiques et al.

(10) Patent No.: US 9,215,065 B2
(45) Date of Patent: Dec. 15, 2015

(54) MEDIA PLAYER SECURITY FOR FULL LENGTH EPISODES

(75) Inventors: Christopher Peter Xiques, Oakland, CA (US); Jignesh Yashwant Dhruv, Monmouth Junction, NJ (US); Shalitha Arosha Senanayake, Hidden Valley Lake, CA (US); James Kong Hsu, Redwood City, CA (US)

(73) Assignee: CBS Interactive Inc., San Francisco, CA (US)

( * ) Notice: Subject to any disclaimer, the term of this patent is extended or adjusted under 35 U.S.C. 154(b) by 330 days.

(21) Appl. No.: 13/399,821

(22) Filed: Feb. 17, 2012

(65) Prior Publication Data

US 2013/0219178 A1    Aug. 22, 2013

(51) Int. Cl.
| | | |
|---|---|---|
| H04L 29/06 | (2006.01) |
| H04L 9/08 | (2006.01) |
| H04L 9/32 | (2006.01) |
| H04N 21/2343 | (2011.01) |
| H04N 21/2347 | (2011.01) |
| H04N 21/845 | (2011.01) |

(52) U.S. Cl.
CPC .............. *H04L 9/083* (2013.01); *H04L 9/3234* (2013.01); *H04L 9/3297* (2013.01); *H04N 21/2347* (2013.01); *H04N 21/23439* (2013.01); *H04N 21/8456* (2013.01); *H04L 2209/60* (2013.01)

(58) Field of Classification Search
USPC .......................................... 713/168; 380/210
See application file for complete search history.

(56) References Cited

U.S. PATENT DOCUMENTS

| | | | | |
|---|---|---|---|---|
| 7,200,681 B1* | 4/2007 | Lewin | ................. | H04L 67/2842 709/246 |
| 7,756,388 B2* | 7/2010 | Plastina | ............... | G11B 27/105 386/241 |
| 2011/0231660 A1* | 9/2011 | Kanungo | ............... | H04N 7/165 713/168 |
| 2011/0252118 A1* | 10/2011 | Pantos | .............. | G06F 17/30053 709/219 |
| 2012/0170741 A1* | 7/2012 | Chen | ................... | H04L 63/0428 380/210 |
| 2012/0284804 A1* | 11/2012 | Lindquist | ............ | H04L 63/0428 726/29 |

OTHER PUBLICATIONS

Purtell, Ben Dodson Ian Vo TJ, and Aemon Cannon Monica S. Lam. "Musubi: Disintermediated Interactive Social Feeds for Mobile Devices."*
U.S. Appl. No. 13/018,312, filed Jan. 31, 2011.
U.S. Appl. No. 13/018,315, filed Jan. 31, 2011.
U.S. Appl. No. 13/018,092, filed Jan. 31, 2011.

* cited by examiner

*Primary Examiner* — Harris C Wang
(74) *Attorney, Agent, or Firm* — Fenwick & West LLP (57) ABSTRACT

A streaming video player and authentication server work in conjunction to provide secure streaming media. Player authentication is used to ensure that only users using an authorized media player authorized users can access and stream the media content. An encryption process protects unauthorized users from playing media streams that are intercepted between the content server and an authorized user. Additionally, timed tokens are used to ensure that a user authorized to access a stream during a specified time period cannot access the same stream at a later time when the user is no longer authorized.

17 Claims, 6 Drawing Sheets

MEDIA PLAYER SECURITY FOR FULL LENGTH EPISODES

BACKGROUND

1. Field of Art

The disclosure generally relates to the field of security for web-based media streaming.

2. Description of Art

Web-based delivery of media content has become an increasingly popular form of content delivery for many content providers. For example, a number of content providers offer digital video content that can be streamed to network-enabled devices such as personal computers, television set-top boxes and mobile devices (e.g., smart phones). However, despite the many advantages of streaming media content, content providers still have significant concerns regarding security of the streamed content. In unsecured form, streaming media content may be susceptible to a variety of techniques that would allow unauthorized viewers to intercept or otherwise obtain the streamed content without permission from the content providers. For example, an unauthorized user could intercept a stream intended for an authorized user or an authorized user could share received content with unauthorized users. Weaknesses in digital security of web-based media streams can significantly impact revenue of content providers who rely on the ability to control access to their content.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The Figures depict embodiments of the disclosed system (or method) for purposes of illustration only. One skilled in the art will readily recognize from the following description that alternative embodiments of the structures and methods illustrated herein may be employed without departing from the principles described herein.

Overview of Example Embodiments

A first example embodiment includes a computer-implemented method for obtaining secure streaming media content on one or more clients. A client transmits a request to an authentication server to authenticate a media player. The request includes at least one secret identifier of the media player. Responsive to the media player being authenticated, the client obtains from the server, an encrypted security asset storing the at least one security identifier in an encrypted format. A request for a media stream is transmitted to the authentication server and includes the encrypted security asset. Responsive to the authentication server verifying the encrypted security asset, playlist information is received identifying a sequence of media segments in a requested media stream. A request for a first media segment in the sequence of media segments is then transmitted based on the playlist information. This request includes the encrypted security asset. A first encryption key for decrypting the first media segment is received responsive to the authentication server verifying the encrypted security asset. The first encrypted media segment in the sequence of media segments is also received. The client decrypts the first encrypted media segment using the first encryption key and plays the first decrypted media segment using the media player.

A second example embodiment includes a computer-implemented method for providing secure media content. An authentication server authenticates a media player executing on a client based on at least one secret identifier transmitted from the client to an authentication server. The authentication server generates an encrypted security asset storing the at least one security identifier and storing a timestamp. The encrypted security asset is transmitted to the client. A request is received for a media stream. The request includes the encrypted security asset. The security identifier stored in the encrypted security asset is verified, and responsive to verification, playlist information is provided indentifying a sequence of media segment in the requested media stream. Responsive to receiving a request for a first media segment, the authentication server obtains a first encryption key for decrypting the first encrypted media segment and transmits the first encryption to the client.

System Architecture

Figure 1:
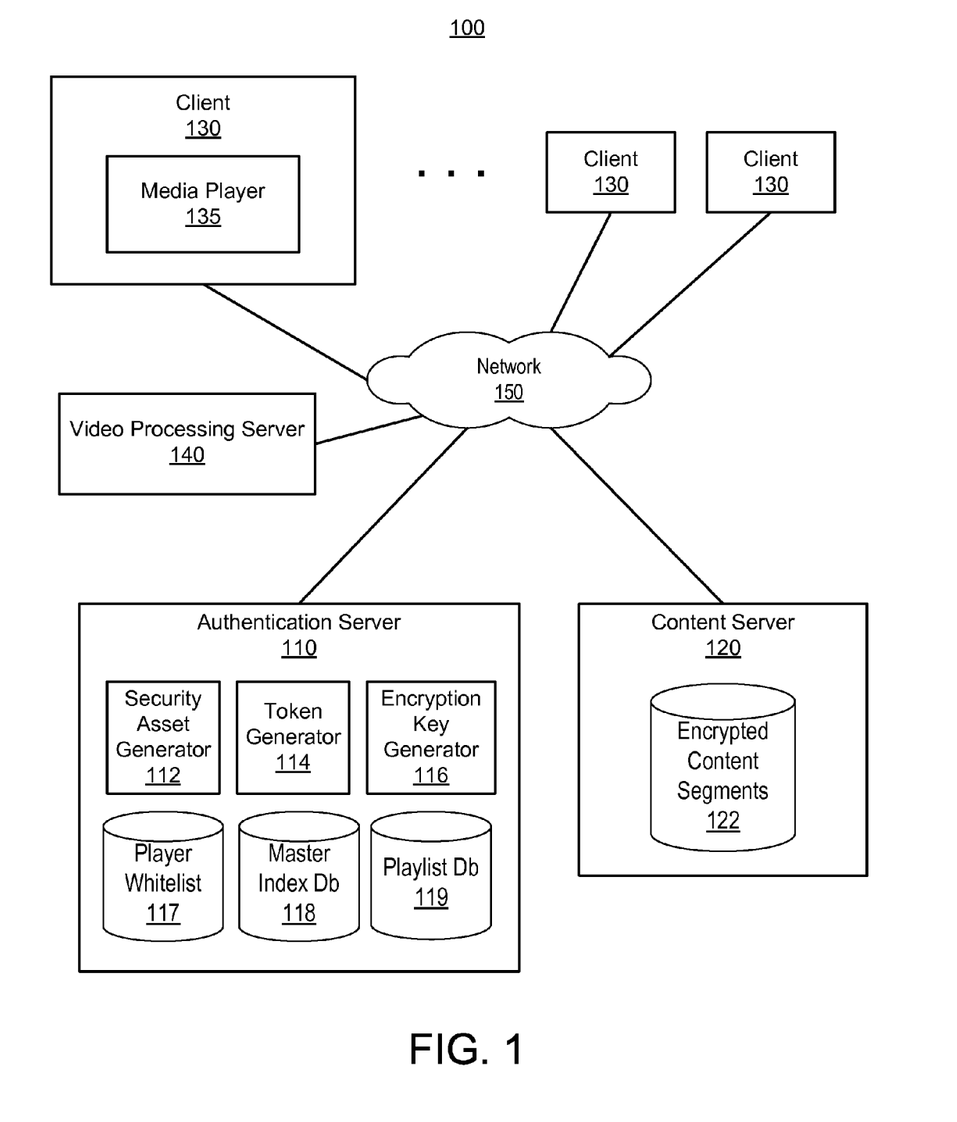
FIG. 1 illustrates an embodiment of a computing environment for providing secure streaming media content to one or more clients.

FIG. 1 is a high level block diagram illustrating an example computing environment 100 for providing secure streaming media content according to one embodiment. An authentication server 110, a content server 120, and a video processing server 140 are coupled to each other and/or one or more clients 130 via a network 140. Only a single instance of the authentication server 110, the content server 120, and the video processing server 140 is shown along with three clients 130 in FIG. 1 in order to simplify and clarify the description. However, embodiments of the computing environment 100 can have thousands or millions of clients 130 as well as multiple authentication servers 110, content servers 120, and/or video processing servers 140. Furthermore, in one embodiment, one or more of the authentication server 110, the content server 120, and the video processing server 140 may be combined in a common server architecture.

The client 130 comprises an electronic device such as a personal computer, a laptop, mobile phone or smartphone, a tablet computer personal digital assistant (PDA) a television set-top box, etc. The client 130 executes a media player 135 that is adapted to play media streams. In one embodiment, the media player 135 comprises a Universal Video Player (UVP), but the embodiments described below also apply to other types of media players. In one embodiment, the media player 135 is embodied as computer program instructions stored to a computer-readable storage medium. When executed, the computer program instructions are loaded in a memory of the client 130 and executed by a processor of the client 130 to carry out the functions of the media player 135 described herein. In one example embodiment, the media player 135 is embedded or otherwise accessed from a mobile application executing on a mobile device. Alternatively, the media player 135 may be an embedded media player within a web page loaded by a web browser. In yet another embodiment, the media player 135 may be an application executing on a television set-top box or similar device. In one embodiment, the media player 135 is implemented using Objective C, although in other embodiments different implementations may be used such as Javascript. Furthermore, in one alternative embodiment, the media player 135 is compatible with an HTML 5 environment.

The network 150 enables communications among the entities connected to it. In one embodiment, the network 150 is the Internet and uses standard communications technologies and/or protocols. At least a portion of the network 150 can comprise a mobile (e.g., cellular or wireless) data network such as those provided by wireless carriers, for example, VERIZON, AT&T, T-MOBILE, SPRINT, O2, VODAPHONE, and other wireless carriers. In some embodiments, the network 150 comprises a combination of communication technologies. The network 150 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, PCI Express Advanced Switching, etc. Similarly, the networking protocols used on the network 150 can include multiprotocol label switching (MPLS), transmission control protocol/Internet protocol (TCP/IP), User Datagram Protocol (UDP), hypertext transport protocol (HTTP), hypertext transfer protocol secure (HTTPS), simple mail transfer protocol (SMTP), file transfer protocol (FTP), etc. The data exchanged over the network 150 can be represented using technologies and/or formats including hypertext markup language (HTML) (e.g., HTML 5), extensible markup language (XML), etc. In addition, all or some of links can be encrypted using encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

The video processing server 140 receives raw media (e.g., a media file such as a video file or a live audio/video input) and processes the raw media to generate a format suitable for streaming. For example, in one embodiment, the video processing engine 140 processes media to enable HTTP Live Streaming (HLS) of the content. In one embodiment, the video processing engine 140 breaks the raw media into a sequence of smaller HTTP-based downloadable files. Each of these downloadable files is referred to as a segment and comprises a time-localized portion of the media file (e.g., a chunk of video). Different pluralities of segments may furthermore be grouped together into chapters, with each segment belonging to only one chapter. In one embodiment, the video processing server 140 may further transcode the media data to a standardized format. Furthermore, the video processing server 140 may create a plurality of parallel streams for the raw media file with each stream corresponding to at least one different encoding parameter. For example, the video processing server 140 may generate two or more streams of the content with each stream having a different bit rate. This allows, for example, different clients 130 to access different versions of the same media content depending on the particular configuration of the client 130 (e.g., memory and/or processing power) and the current network conditions (e.g., available network bandwidth).

For secure streaming, the video processing server 140 encrypts the media segments using an encryption key. In one embodiment, for example, a unique encryption key is created for each chapter of a media stream for a particular bit rate. Thus, in this embodiment, all of the segments corresponding to the same bit rate and within the same chapter are encrypted using the same unique encryption key. In an alternative embodiment, encryption keys are not necessarily unique between bit rates or between chapters (e.g., the same encryption key may be used for the entire stream). In another alternative embodiment, the encryption key for a segment may be unique even between segments within the same chapter. In one embodiment, the encryption key is based on at least a portion of the chapter title or other identifier and/or at least one secret key file. For example, in one embodiment, the encryption key is an output of a hash function applied to the chapter identifier and the secret key file. This would allow, for example, the encryption key for a given segment to be determined if the chapter identifier, secret key file, and the hash function are all known. The encrypted segments are stored to the encrypted content database 122 of the content server 120.

The video processing server 140 furthermore creates a master index and one or more playlist files associated with each media stream. The master index (in some protocols referred to as a "variant playlist") comprises references or links (e.g., URLs) to the one or more playlist files. Each of the playlists referenced in the master index correspond to the different streams of the media content encoded according to different encoding parameters (e.g., bit rate). For example, a first playlist referenced in the master index may correspond to a low definition bit rate, a second playlist referenced in the master index may correspond to a medium definition bit rate, and a third playlist referenced in the master index may correspond to a high definition bit rate. Each playlist includes a sequence of links (e.g., HTTP or HTTPS URLs) to different segments of the streaming media content. In one embodiment the playlist is an M3U8 playlist. The video processing server 140 provides the master index and the playlists to the authentication server 110 for storage in the master index database 118 and playlist database 119 respectively.

The authentication server 110 controls access of the clients 130 to the streaming media content and ensures that only authorized clients 130 are granted access. Generally, the authentication server 110 receives requests for content from a client 130 and determines whether or not the client 130 is authorized to receive the stream. The authentication server 110 denies access to unauthorized clients 130 and grants access to authorized clients 130. In one embodiment, the authentication server 110 comprises a security asset generator 122, a token generator 124, an encryption key generator 126, a player whitelist 117, a master index database 118, and a playlist database 119. In alternative embodiments, different or additional components may be included.

The master index 118, player database 119, and player whitelist 117 store various data used by the authentication server 110 to control access to secure streaming media content. For example, the master index 118 and player database 119 store master indices and playlists respectively for various media streams, as described above. The player whitelist 117 stores information identifying valid media players 135, i.e., media players that are authorized to access the streaming content. For example, in one embodiment, the player whitelist 117 stores various security data associated with players 135 seeking access to content. The authentication server 110 can compare security data received from a requesting client 130 against entries in the whitelist 117 and allows access to the content if an entry matches (or alternatively, deny access to the content if no entry matches). The security data may include, for example, a secret identifier associated with the media player 135, and/or a username/password associated with a particular authorized viewer making the request.

The security asset generator 112 generates security assets for clients 130 once they are authorized to access streaming media content. For example, in one embodiment, the security asset comprises a web cookie that stores security data associated with the authorized client 130 in encrypted form. An encryption key for decrypting the security asset is known to the authentication server 110, but is kept secret from the client 130. Thus, individuals are prevented from extracting the security data stored in the encrypted asset. The security asset is used by the clients 130 and the authentication 110 in facilitating secure streaming of content, as will be described in further detail below.

The encryption key generator 116 generates or obtains encryption keys associated with each requested content segment. In one embodiment, the encryption key for a particular segment is stored at a static URL location (e.g., located on the content server 120), and the encryption key generator 116 requests and obtains the encryption key whenever a particular content segment is requested from an authorized client 130. Alternatively, the encryption key generator 116 dynamically generates the correct encryption key (i.e., the same encryption key used by the video processor 140 to encrypt the segment) for decrypting a particular content segment in response to receiving a request from a client 130 for that particular content segment. For example, if the content segment is encrypted using an encryption key that is based on a chapter identifier and a secret key file, as described above, the encryption key generator 116 can determine the correct encryption key based on the chapter identifier for the requested segment and the secret key file.

The token generator 114 generates timed tokens that can be associated with encryption keys passed between the authentication server 110 and the client 130. For example, in one embodiment, the token generator 114 tokenizes a URL or other reference corresponding to the encryption key's location on the authentication server 110. The token comprises a set of characters that appear in the link (e.g., within a URL address) associated with the encryption key. Thus, to obtain the encryption key, the client 130 makes a call to the authentication server 110 using the appropriate link (e.g., URL address) that includes the correct token. If the token is incorrect, the authentication server 110 will not return the encryption key. In one embodiment, the token's validity is limited to a predetermined period of time (e.g., 3 hours). Thus, after the time period expires, the tokenized link associated with the encryption key will no longer be valid for obtaining the encryption key, and a different token may instead be assigned.

It is noted that the predetermined period of time can correspond with a length of a media event that may be represented by the media that is streamed.

The content server 120 provides media content to authorized clients 130. For example, in one embodiment, the content server 120 receives a request for a particular content segment. The content server 120 provides the requested segment to the requesting client 130 in encrypted form (e.g., from encrypted content segments database 122). In one embodiment, links (e.g., URLs) pointing to the location of the segment on the content server 120 may be tokenized so that the content server 110 only returns the requested segment if the correct token is provided. These tokens generally have a limited valid lifetime so that the token associated with a particular segment dynamically changes over time. Operation of the content server 120 in conjunction with requests for streaming content is described in further detail below.

Example Operation and Use

Figure 2:
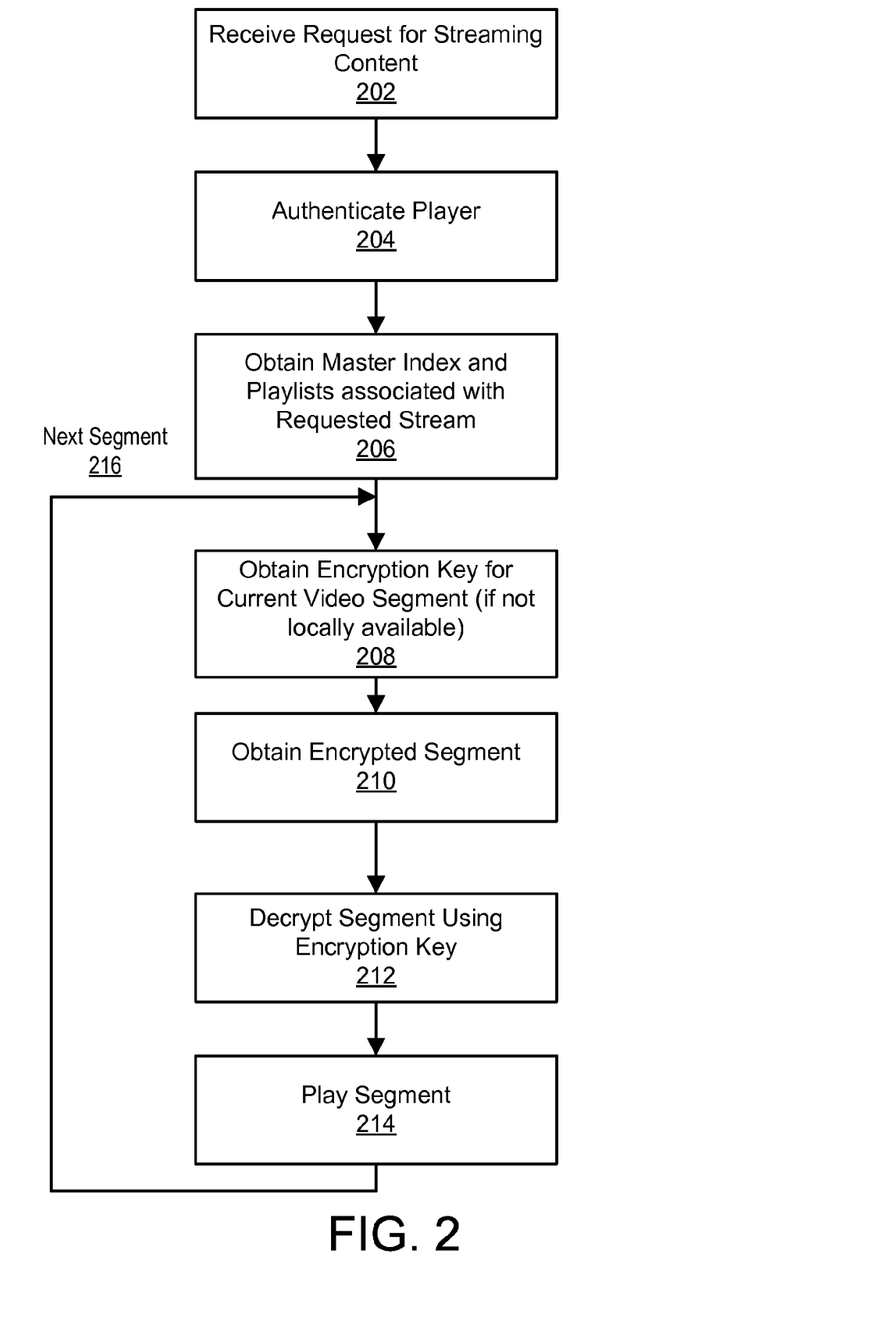
FIG. 2 illustrates an embodiment of a process for obtaining secure streaming media content on an authorized client.

FIG. 2 illustrates an embodiment of a process for obtaining a secure media content stream. The client 130 receives 202 a request for streaming media content (e.g., from a user via a user interface). For example, a user of the client 130 may select content for streaming from a list of selectable content on a web page. Alternatively, the user may select content using an application executing on the client 130 (e.g., an application executing on a mobile device). The client 130 then attempts to authenticate 204 the media player 135 with the authentication server 110. In this authentication step 204, the client sends security data associated with the player 135 to the authentication server 110 and the authentication server 110 verifies whether or not the player 135 is authorized to receive the requested content based on the security data. Requiring player authentication beneficially ensures that the player is authentic, i.e., a player that the content provider intends to be allowed to stream its content. Thus, if a user tries to access the video stream using a different player (e.g., one provided by another entity or one created or modified by the user), the authentication server 120 will not authenticate the player because the player will be unable to provide valid security data. In one embodiment, the security data is transferred in encrypted form (e.g., via HTTPS). This prevents potential eavesdroppers from obtaining the security data of another authorized user. Furthermore, the authentication step 204 could optionally ensure that the user making the request is authorized. For example, the client 130 may obtain a username and password from the requestor, and include this information in security data transmitted to the authentication server 110. A process for authenticating 204 the media player 135 is described in further detail below with reference to FIG. 3.

The client 130 then obtains 206 a master index (e.g., from the master index database 118) and one or more playlists (e.g., from the playlists database 119) associated with the requested media stream. In one embodiment, this information is also provided in encrypted form (e.g., via HTTPS). In one embodiment, the client 130 initially selects one of the playlists (corresponding to a particular encoding of the media stream) based on, for example, a default initial setting or monitored characteristics of the network 150, client 130, and/or the authentication server 110. Beginning with the first segment in the selected playlist, the client 130 obtains 208 an encryption key corresponding to the current segment. The client 130 then obtains 210 the encrypted segment referenced in the playlist, if it is not already locally available. For example, as described above the client 130 may use the same encryption key for all of the segments corresponding to a particular chapter and therefore does not need to re-obtain the encryption key with each segment. Alternatively, a different encryption key may be used for each segment, or the same encryption key may be used for the entire stream. By encrypting the segments, the media stream is protected against users attempting to share the media stream with unauthorized users. Even if the data files are shared, they will not be decipherable without the corresponding encryption keys. Furthermore, by using timed tokens, the links (e.g., URLs) provided in the playlists that are used to obtain the encryption keys and the content segments will only be valid for a limited period of time. This enables the content provider to control the period of time for which content is accessible for a particular user.

The client 130 decrypts 212 the encrypted segment using the encryption key. Once the segment is decrypted, the client plays 214 the segment using the media player 135. Steps 208-214 then repeat 216 for the next segment in the playlist. Over time during streaming, the client 130 may switch between different playlists (corresponding to different encoding parameters) based on streaming performance. For example, if the bandwidth of the network connection is too low to support the bit rate of the selected playlist, the client may switch to a playlist corresponding to a lower bit rate. Alternatively, if the network bandwidth is high enough to support a playlist corresponding to a higher bit rate, the client 130 may switch to the higher bit rate playlist in order to provide better quality video content.

Figure 3:
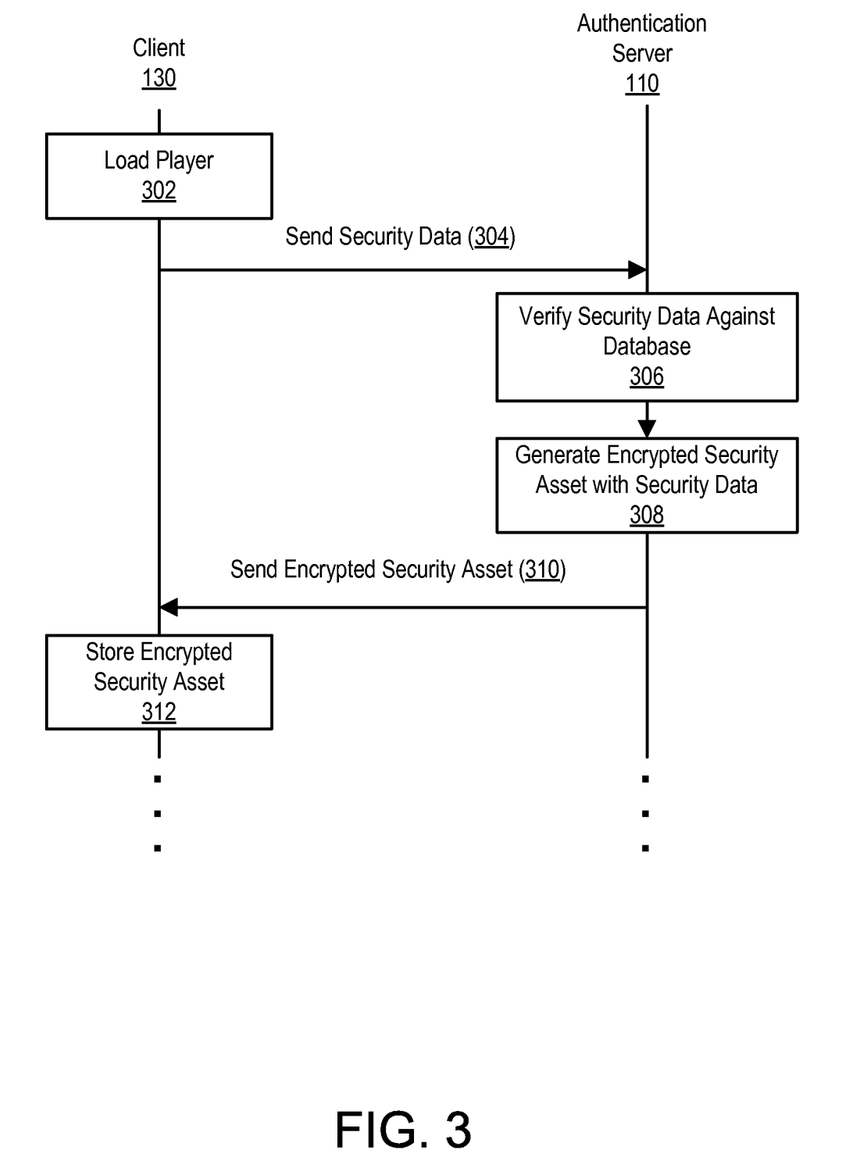
FIG. 3 illustrates an embodiment of processes for authenticating a media player for secure media streaming to an authorized client.

FIG. 3 illustrates an embodiment of processes performed by the client 130 and authentication server 110 for authenticating 204 the media player 135 and/or the user making the request. The client 130 loads 302 the media player, which may be in the form of, for example, a mobile application or portion thereof, an embedded player on a web page, an application executing on a television set-top box, etc. The client 130 sends 304 security data to the authentication server 110 to verify that the client 130 is authorized to access the requested content (e.g., via HTTPS or other encrypted protocol). For example, in one embodiment, the client 130 sends one or more of a player identifier, an application identifier, and a session identifier as the security data. The player identifier is a set of characters associated with the media player 135. For example, the player identifier may be embedded in the program instructions associated with the media player 135 so that an authentic player can be distinguished from a third-party player that would lack the correct player identifier. The application identifier comprises a set of characters unique to the application used to load the media player 135. The session identifier comprises a set of characters identifying the particular streaming session associated with a single request for video content. For example, in one embodiment, a new session identifier is randomly generated each time a request for streaming content is made and the session identifier remains constant throughout streaming of that requested content, or for a predefined period of time. Optionally, the client 130 also sends a username and password associated with the user making the request together with the player security data.

The authentication server 110 attempts to verify 306 at least some of the security data against the player whitelist 117. For example, in one embodiment, the authentication server 110 attempts to verify 306 that the received player identifier and application identifier match an entry in the player whitelist 117. In one embodiment, the authentication server 110 also attempts to verify 306 the username and password against entries in the whitelist 117. In one embodiment, the session identifier is not verified in this step 306 because it is generated when the session starts and is not yet known to the authentication server 110. Alternatively, the session identifier may still be checked to make sure it is authentic even if the exact value is not known in advance by, for example, verifying that the session identifier has a particular format or checksum. The authentication server 110 then generates 308 an encrypted security asset (e.g., a web cookie) using the security asset generator 112. The security asset stores the received security data (e.g., the player identifier, application identifier, session identifier, and optionally a username/password) in an encrypted form that can be decrypted using an encryption key known to the authentication server 110, but typically secret from the client 130.

In one embodiment, the encrypted security asset further stores a timestamp generated by the authentication server 110 when the security asset is created. This timestamp can be used to ensure that the encrypted security asset will only be valid for a limited period of time, and enables the authentication server to prevent a user from using the same security asset to obtain the streams at a later time when the user is not authorized. The authentication server 110 sends 310 the encrypted security asset to the client 130 (e.g., using HTTPS or another encrypted protocol) and the client 130 stores 312 the encrypted security asset. The encrypted security asset serves as evidence that the player 135 executing on the client 130 has been authenticated and remains valid until the security asset expires.

Figure 4:
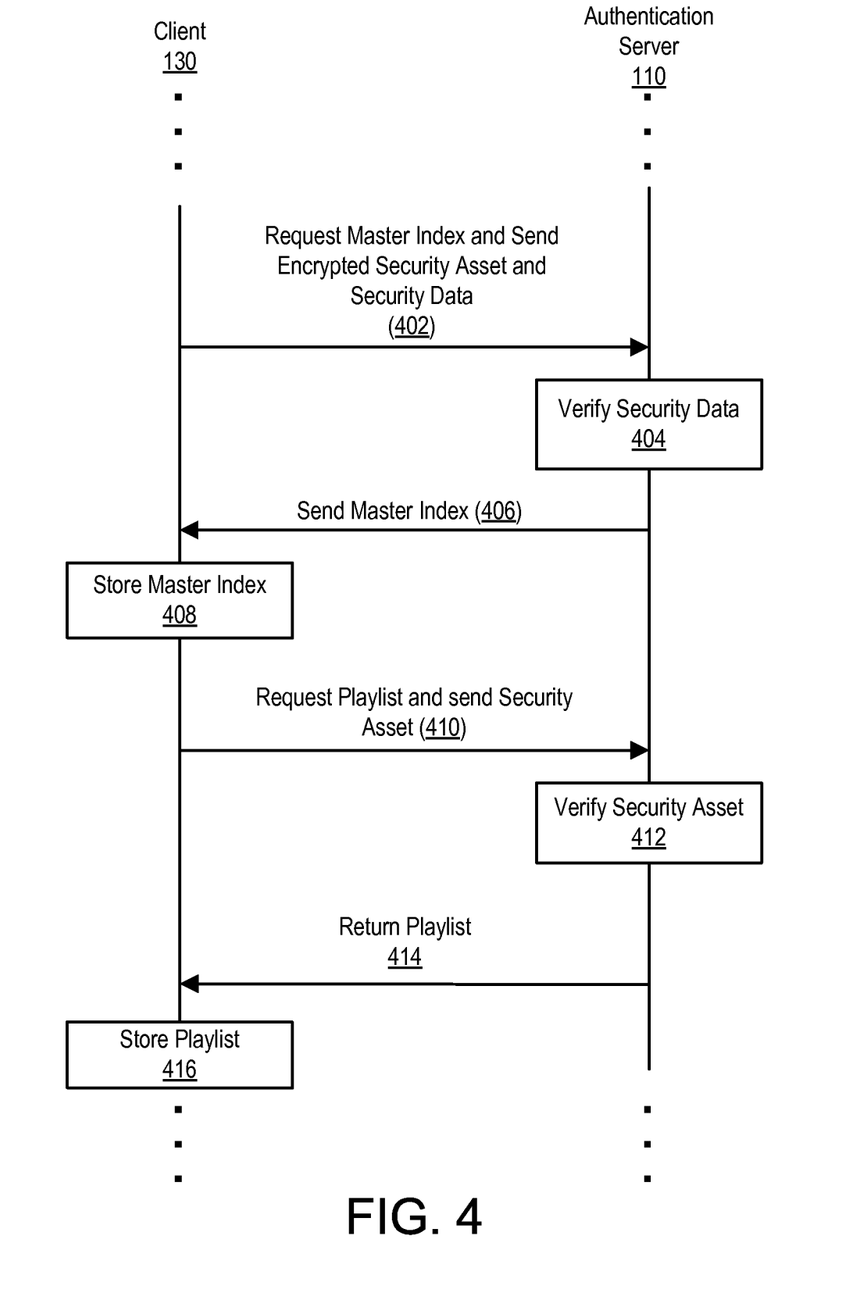
FIG. 4 illustrates an embodiment of a process for securely providing a master index and playlists pertaining to requested streaming media content to an authorized client.

FIG. 4 illustrates an embodiment of a process for securely obtaining the master index and playlists corresponding to the requested media content. The client 130 sends 402 (e.g., via HTTPS or other encrypted protocol) a request to the authentication server 110 for the master index and sends its security data (e.g., the player identifier, the application identifier, and the session identifier) and the encrypted security asset to the authentication server 100. The authentication server 110 then decrypts the security asset and attempts to verify 404 the security data. For example, the authentication server 110 ensures that the player identifier and application identifier match an entry in the player whitelist 117 and ensures that the player identifier and application identifier match the corresponding data stored in received the encrypted security asset. Furthermore, the authentication server 110 checks the timestamp to ensure that it is not expired. If a username and password are required, the authentication server 110 may also verify these against the whitelist 117. In an alternative embodiment, the client 130 may instead transmit only one of the security data and the encrypted security asset in this step since the information is redundant. However, this redundancy may be beneficial in providing an additional layer of security (e.g., if a user attempts to transfer a valid security asset from one device to another or if a user gains access to the security information itself). If the security data cannot be verified, the authentication server 110 may deny the request for the master index.

If the security data is verified, the authentication server 110 sends 406 the master index to the client 130 (e.g., via HTTPS or other encrypted protocol) and the client 130 stores 408 the master index. The client 130 then requests 410 one or more of the playlists using the links (e.g., URLs) provided in the master index (e.g., via HTTPS or other encrypted protocol). The client furthermore sends with this request, the encrypted security asset containing the encrypted security data (or alternatively, or in addition, the security data itself). The authentication server 110 decrypts the encrypted security asset and attempts to verify 412 the security data against the entries in the player whitelist 117. If the security data cannot be verified (i.e., does not match an entry in the whitelist 117) or if the timestamp is expired, the authentication server 110 may deny the request. If the security data is verified and the timestamp is not expired, the authentication server 110 returns 414 the requested playlist (e.g., via HTTPS or other encrypted protocol) and the client 130 stores 416 the playlist. As explained previously, the links (e.g., URLs) for the content segments may be tokenized, i.e., the link includes a token (e.g., a set of characters) that can change dynamically over time, so that the tokenized reference in the playlist only points to the segment file for a limited time period, after which the token associated with that segment file may change.

Furthermore, the link (e.g., URL) associated with the encryption key may also be tokenized, so that the link only references the encryption key for a limited period of time, after which the token will expire. In one embodiment, the links for the encryption keys are masked links (e.g., masked URLs). In the masked link, a portion of the link that identifies the content segment is encrypted so that viewing the characters in the link alone will not reveal which content segment it corresponds to. The key for decrypting the masked link is known to the authentication server 110. The client stores 416 the received playlist to the playlist database 119.

Figure 5:
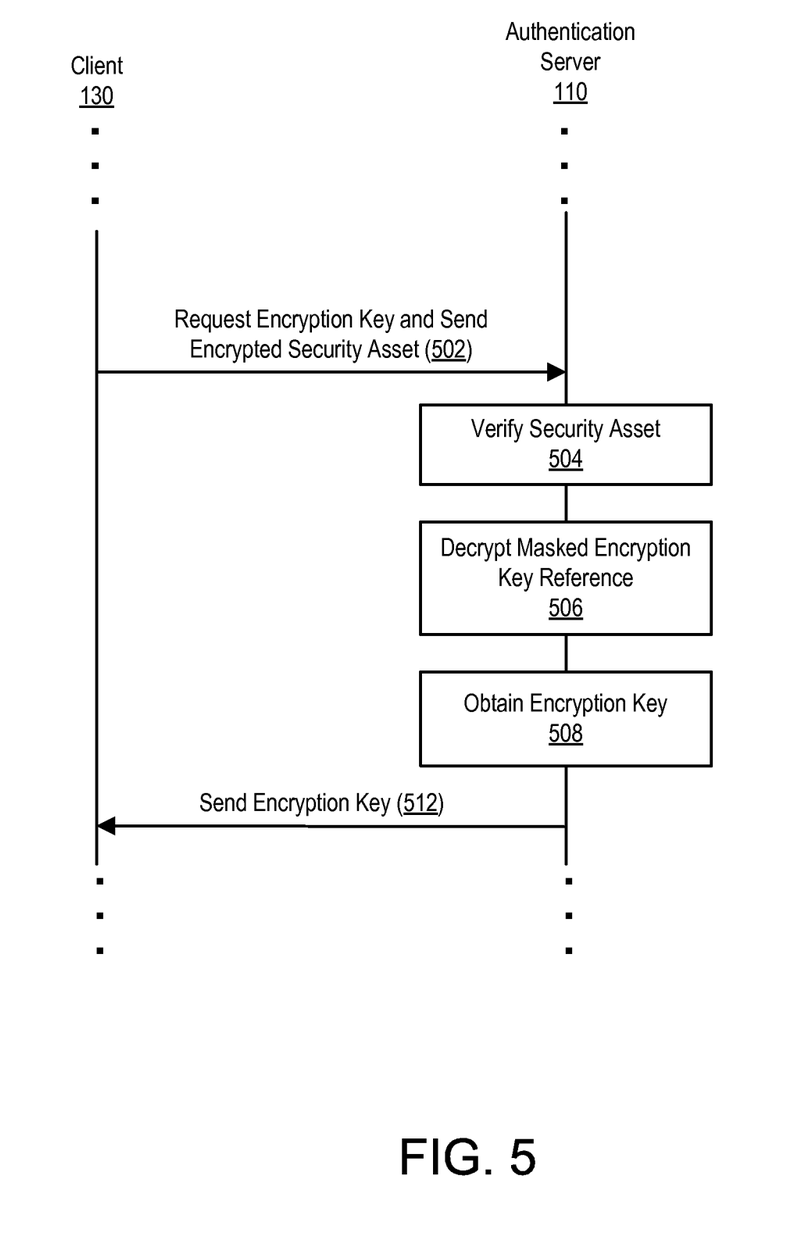
FIG. 5 illustrates an embodiment of a process for securely obtaining encryption keys for decrypting encrypted streaming media content for playback on an authorized client.

FIG. 5 illustrates an embodiment of a process for obtaining an encryption key for the current video segment, if not already available (e.g., because the same encryption key was used for the prior segment and the client 130 therefore already has the appropriate key). The client 130 request 502 (e.g., via HTTPS or other encrypted protocol) the encryption key from the authentication server 110 by using the links (e.g., HTTPS URLs that may be masked URLs and may include a timed token) specified in the playlist, and furthermore sends its encrypted security asset. The authentication server 110 again attempts to verify 504 the encrypted security asset by ensuring that the player identifier and application identifier (and optionally username/password) match the player whitelist and the timestamp is not expired. Furthermore, the authentication server 110 verifies that the timed token associated with the request is valid and not expired. If the all information is verified, the authentication server 110 decrypts 506 the masked portion of the link if necessary to determine which segment is being requested. The authentication server 110 then obtains 508 the encrypted key for the requested segment. In one embodiment, the encryption key associated with the content segment may be dynamically generated when the request for the playlist is received (e.g., using the encryption key generator 116). Alternatively, rather than dynamically generating the encryption key, the authentication server 110 instead merely requests the encryption key from a static URL (e.g., a URL on the content server 120) that is known to the authentication server 110. The authentication server 110 then sends 512 the encryption key to the client 130 via an encrypted protocol (e.g., HTTPS).

Figure 6:
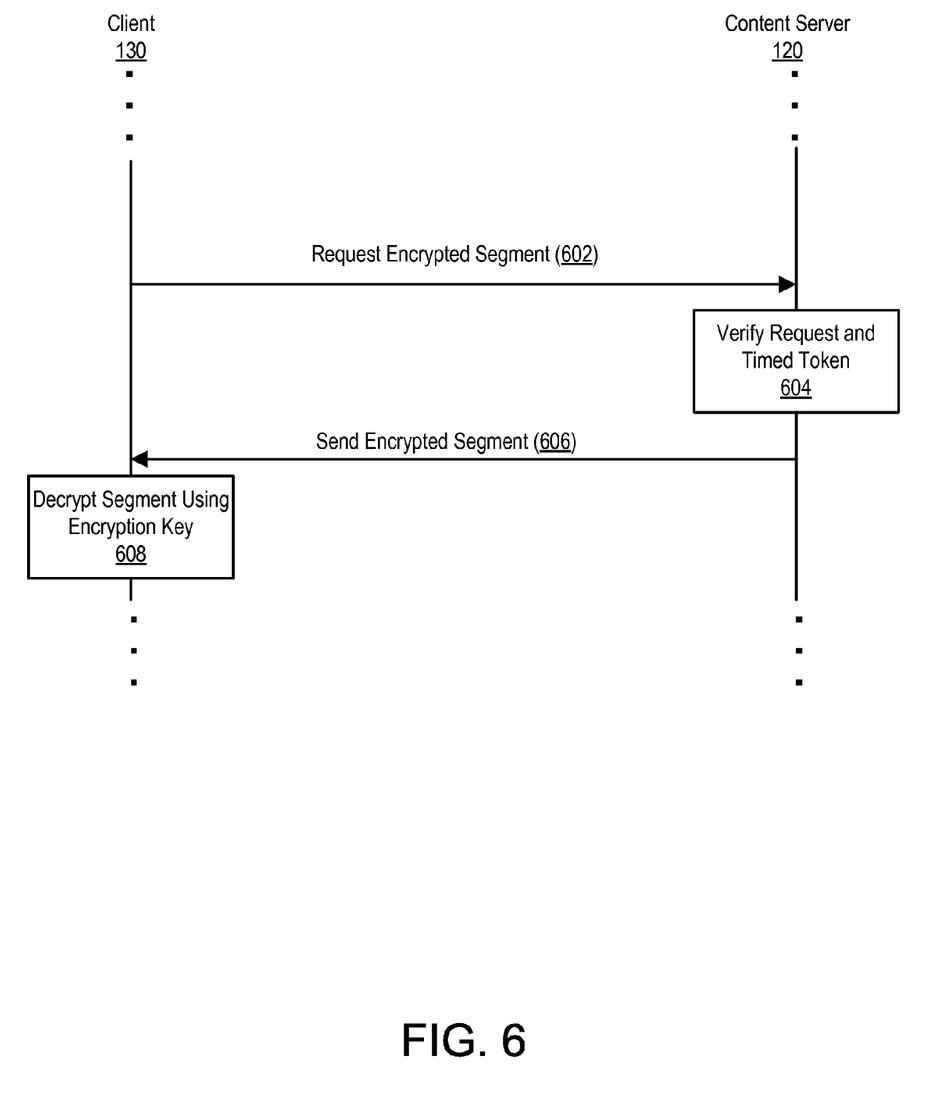
FIG. 6 illustrates an embodiment of a process for streaming encrypted content to an authorized client and decrypting the content for playback by the authorized client.

FIG. 6 illustrates an embodiment of a process for decrypting a segment using the encryption key. The client 130 requests 602 a media segment from the content server 120 using the link in the playlist associated with the media segment (e.g., a URL with a timed token). The content server 120 verifies 604 that the link to the requested segment is valid and the time token is valid and not expired. If the request is verified, the content server 120 sends 606 the encrypted segment to the client 130. In one embodiment, the segment is sent via an unsecure protocol (HTTP) rather than an encrypted protocol such as HTTPS because the segment itself is already encrypted. The client 130 decrypts 608 the segment using the encryption key and plays the segment through a media player.

Beneficially, the described embodiments enable secure media streaming of content using a protocol such as HLS. By employing a player authentication technique, content providers can ensure that only users using an authorized player are allowed to access the content, thus preventing access to content using custom-made players. Furthermore, by using encryption of media segments, the streams are protected from eavesdroppers that seek to intercept a stream transmitted to an authorized user. Additionally, by using security assets, timed tokens, and other exchanges of secure information, an authorized user is prevented from sharing a stream with an unauthorized device or re-accessing a stream during a later time period when the user is no longer authorized.

Additional Considerations

It is noted that terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for secure streaming of media content disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for obtaining secure streaming media content, the method comprising:
    obtaining from an authentication server responsive to a request for authentication of a media player, an encrypted security asset storing at least one security identifier and storing a timestamp in an encrypted format, wherein the timestamp is associated with a time of the request for authentication of the media player;
    transmitting a request for a media stream to the authentication server, the request for the media stream including the encrypted security asset storing the at least one security identifier and storing the timestamp;
    receiving from the authentication server, playlist information identifying a sequence of media segments in the requested media stream, the playlist information received in response to the authentication server decrypting the encrypted security asset, comparing the at least one security identifier of the decrypted security asset against a whitelist storing identities of authentic media players, authenticating the media player responsive to finding a match between the at least one security identifier in the decrypted security asset and the whitelist, and verifying that the timestamp of the decrypted security asset is not expired;

transmitting a request to the authentication server for a first encryption key associated with a first media segment in the sequence of media segments based on the playlist information, the request for the first encryption key associated with the first media segment including the encrypted security asset storing the at least one security identifier and the timestamp;

receiving the first encryption key associated with the first media segment in the sequence of media segments responsive to the authentication server decrypting the encrypted security asset, comparing the at least one security identifier of the decrypted security asset against a whitelist storing identities of authentic media players, authenticating the media player responsive to finding a match between the at least one security identifier in the decrypted security asset and the whitelist, and verifying that the timestamp of the decrypted security asset is not expired, the first encryption key obtained by the authentication server upon receiving the request;

transmitting a request to a content server for the first media segment;

receiving the first media segment from the content server in an encrypted format;

decrypting the first media segment using the first encryption key; and playing the first media segment using the media player.

2. The method of claim 1, further comprising:

transmitting a request to the authentication server for a second encryption key associated with a second media segment in the sequence of media segments based on the playlist information, the request for the second encryption key associated with the second media segment including the encrypted security asset storing the at least one security identifier and the timestamp;

receiving the second encryption key associated with the second media segment in the sequence of media segments responsive to the authentication server decrypting the encrypted security asset, verifying the at least one security identifier of the decrypted security asset matches the whitelist, and verifying that the timestamp of the decrypted security asset is not expired, the second encryption key dynamically generated by the authentication server upon receiving the request;

transmitting a request to the content server for the second media segment;

receiving the second media segment in an encrypted format; decrypting the second media segment using the second encryption key; and playing the second media segment using the media player.

3. A computer-implemented method for providing access to secure media content, the method comprising:

authenticating a media player executing on a client based on at least one security identifier transmitted from the client to an authentication server;

providing an encrypted security asset to the client, the encrypted security asset storing the at least one security identifier and storing a timestamp in an encrypted format, wherein the timestamp is associated with a time of authenticating the media player;

receiving a request from the client for a media stream, the request for the media stream including the encrypted security asset storing the at least one security identifier and storing the timestamp;

verifying the received encrypted security asset, wherein the verifying comprises:
  decrypting the received encrypted security asset;
  comparing the at least one security identifier of the decrypted security asset against a whitelist storing identities of authentic media players;
  authenticating the media player responsive to finding a match between the at least one security identifier of the decrypted security asset and the whitelist; and
  verifying that the timestamp of the decrypted security asset is not expired;

responsive to verifying that the timestamp is not expired, providing playlist information identifying a sequence of media segments in the requested media stream;

receiving a request from the client for a first encryption key associated with a first media segment in the sequence of media segments, the request including the encrypted security asset storing the at least one security identifier and storing the timestamp in the encrypted format;

responsive to receiving the request for the first encryption key associated with the first media segment in the sequence of media segments, verifying the encrypted security asset wherein the verifying comprises:
  decrypting the received encrypted security asset;
  comparing the at least one security identifier of the decrypted security asset against a whitelist storing identities of authentic media players;
  authenticating the media player responsive to finding a match between the at least one security identifier of the decrypted security asset and the whitelist; and
  verifying that the timestamp of the decrypted security asset is not expired; and responsive to verifying that the timestamp is not expired, obtaining the first encryption key for the first media segment and transmitting the first encryption key to the client, the first encryption key for decrypting the first media segment.

4. The method of claim 3, wherein the obtaining the first encryption key comprises:

dynamically generating the first encryption key responsive to receiving the request for the first encryption key associated with the first media segment.

5. The method of claim 3, wherein the obtaining the first encryption key comprises:

requesting the encryption key from a static URL responsive to receiving the request for the first encryption key associated with the first media segment.

6. The method of claim 3, wherein providing the playlist information comprises:

receiving a request for a master index together with the encrypted security asset; and responsive to verifying that the timestamp is not expired, transmitting the master index comprising links to one or more playlists, each of the one or more indexes corresponding to a different bit rate and each of the one or more playlists comprising links to the sequence of media segments.

7. The method of claim 6, further comprising:

receiving a request for the one or more playlists together with the encrypted security asset storing the at least one security identifier and storing the timestamp; and responsive to verifying that the timestamp is not expired, transmitting the one or more playlists and links to encryption keys corresponding to entries of the one or more playlists.

8. The method of claim 7, wherein transmitting the one or more playlists and links to encryption keys comprises:
 masking a link to the first encryption key by encrypting at least a portion of the link.

9. The method of claim 1, wherein the encrypted security asset stores at least one of: a player identifier associated with the media player, an application identifier associated with an application used to load the media player, and a session identifier associated with a current execution of the media player.

10. The method of claim 1, wherein transmitting the request for the media stream to the authentication server comprises:
 transmitting to the authentication server for verification at least one of: a player identifier associated with the media player, an application identifier associated with an application used to load the media player, and a session identifier associated with a current execution of the media player.

11. The method of claim 1, wherein the encrypted security asset comprises an encrypted web cookie.

12. The method of claim 3, wherein the authentication server dynamically generates the first encryption key responsive to receiving the request for the first media segment.

13. A non-transitory computer-readable storage medium storing instructions for providing access to secure media content, the instructions when executed by a processor causing the processor to perform steps including:
 authenticating a media player executing on a client based on at least one security identifier transmitted from the client to an authentication server;
 providing an encrypted security asset to the client, the encrypted security asset storing the at least one security identifier and storing a timestamp in an encrypted format, wherein the timestamp is associated with a time of authenticating the media player;
 receiving a request from the client for a media stream, the request for the media stream including the encrypted security asset storing the at least one security identifier and storing the timestamp;
 verifying the received encrypted security asset, wherein the verifying comprises:
  decrypting the received encrypted security asset;
  comparing the at least one security identifier of the decrypted security asset against a whitelist storing identities of authentic media players;
  authenticating the media player responsive to finding a match between the at least one security identifier of the decrypted security asset and the whitelist; and
  verifying that the timestamp of the decrypted security asset is not expired;
 responsive to verifying that the timestamp is not expired, providing playlist information identifying a sequence of media segments in the requested media stream;
 receiving a request from the client for a first encryption key associated with a first media segment in the sequence of media segments, the request including the encrypted security asset storing the at least one security identifier and storing the timestamp in the encrypted format;
 responsive to receiving the request for the first encryption key associated with the first media segment in the sequence of media segments, verifying the encrypted security asset, wherein the verifying comprises:
  decrypting the received encrypted security asset;
  comparing the at least one security identifier of the decrypted security asset against a whitelist storing identities of authentic media players;
  authenticating the media player responsive to finding a match between the at least one security identifier of the decrypted security asset and the whitelist; and
  verifying that the timestamp of the decrypted security asset is not expired; and
 responsive to verifying that the timestamp is not expired, obtaining the first encryption key for the first media segment and transmitting the first encryption key to the client, the first encryption key for decrypting the first media segment.

14. The non-transitory computer-readable storage medium of claim 13, wherein the obtaining the first encryption key comprises:
 dynamically generating the first encryption key responsive to receiving the request for the first encryption key associated with the first media segment.

15. The non-transitory computer-readable storage medium of claim 13, wherein the obtaining the first encryption key comprises:
 requesting the encryption key from a static URL responsive to receiving the request for the first encryption key associated with the first media segment.

16. The non-transitory computer-readable storage medium of claim 13, wherein providing the playlist information comprises:
 receiving a request for a master index together with the encrypted security asset; and
 responsive to verifying that the timestamp is not expired, transmitting the master index comprising links to one or more playlists, each of the one or more indexes corresponding to a different bit rate and each of the one or more playlists comprising links to the sequence of media segments.

17. The non-transitory computer-readable storage medium of claim 13, wherein the encrypted security asset stores at least one of: a player identifier associated with the media player, an application identifier associated with an application used to load the media player, and a session identifier associated with a current execution of the media player.

* * * * *